Patented Nov. 18, 1947

2,430,907

UNITED STATES PATENT OFFICE 2,430,907

NITROGEN - SUBSTITUTED POLYAMIDES AND PROCESS FOR OBTAINING SAME

Theodore Le Sueur Cairns, Wilmington, Del., assignor to E. I. du Pont de Nemours & Company, Wilmington, Del., a corporation of Delaware No Drawing. Application June 8, 1944, Serial No. 539,399

11 Claims. (Cl. 260—72)

This invention relates to synthetic polymeric materials and more particularly to chemically modified polyamides.

This application is a continuation-in-part of my application Serial Number 445,635, filed June 3, 1942.

The above mentioned application is concerned with a new class of polyamides and their preparation by reacting a synthetic linear polyamide having a hydrogen-bearing amide group in the presence of an oxygen-containing acid catalyst with formaldehyde and a formaldehyde-reactive organic compound having hydrogen attached to an element of Group V and VI of Series 2 and 3 of the Periodic table. When the formaldehyde-reactive organic compound used is an alcohol, the products are N-alkoxymethyl polyamides, i. e., products in which one or more of the original hydrogen-bearing amide groups have been converted into groups of structure

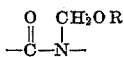

where R represents the organic radical of the alcohol, ROH, used. The present invention is concerned with products formed in a similar manner using alcohols having a carboxyl group or a substituted carboxyl group such as a carboalkoxy group.

This invention has as an object the preparation of new and useful polymeric materials. A further object is the conversion of synthetic linear polyamides into water-soluble products or products which are easily rendered water-soluble.

The objects are accomplished through the production of a new class of nitrogen-substituted polyamides by a process comprising reacting a polyamide having hydrogen-bearing amide groups, in the presence of an oxygen-containing acid catalyst with formaldehyde and a substance of the class consisting of hydroxy carboxylic acids and esters of hydroxy carboxylic acids. The above-mentioned acid catalysts are oxygen-containing acids having an ionization constant at least as great as $9.6 \times 10^{-6}$ and an equivalent conductance, measured at 25° C. in 0.01 N concentration, no greater than 370 ohms$^{-1}$. cm.$^2$. This invention also embraces the conversion of the resultant products into salts and other carboxylic acid derivatives.

The invention is illustrated by the following examples in which parts are given by weight unless otherwise indicated.

Example 1

The polyamide used in this example was an interpolyamide prepared by heating 30 parts of hexamethylenediammonium adipate and 70 parts of hexamethylenediammonium sebacamide under polymerizing conditions as described in U. S. Patent 2,252,554 until a high molecular weight fiber-forming polymer was obtained.

Thirty parts of the above interpolyamide was dissolved in 122 parts of 100% formic acid at 70–80° C. and to this solution was added 20 parts of paraformaldehyde suspended in 117 parts of methyl glycolate. After 10 minutes' reaction at 70 to 80° C., 28 parts of denatured ethanol was added and the reaction mixture was poured into a solution of 100 parts of sodium hydroxide dissolved in 1700 parts of water. This caused the N-carbomethoxymethoxymethyl substituted interpolyamide to precipitate. After washing to remove alkali and salts, the modified interpolyamide was obtained as a white fibrous solid. Unlike the original interpolyamide it was soluble in hot ethanol. Clear tough films, which were susceptible to cold drawing, were readily prepared from solutions of the modified interpolyamide by casting the solutions on a smooth surface and evaporating the solvent. Chemically the product differed from the original interpolyamide in that it contained substituted amide groups of structure

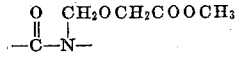

Example II

A solution of 60 parts of polyhexamethylene adipamide (intrinsic viscosity about 1.0) in a mixture of 180 parts of 90% formic acid and 60 parts of glycolic acid was prepared at 60° C. To this solution was added a slurry of 60 parts paraformaldehyde, 150 parts glycolic acid and 50 parts water. During the course of the next 35 minutes at 60° C., 20 parts of water was added. The reaction mixture was then poured into approximately 1800 parts of a 1:1 (by volume) mixture of water and acetone. A clear solution resulted from which the modified polymer was precipitated by the addition of aqueous ammonia. The precipitated N-carboxymethoxymethyl polyhexamethylene adipamide was found to be readily soluble in aqueous ethanol, whereas polyhexamethylene adipamide is insoluble in aqueous ethanol. Analysis showed that the product contained 4.83% combined formaldehyde which indicated that 15% of the amide groups in the original polyamide had been converted into groups of formula

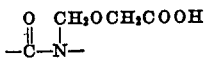

Example III

A mixture of 100 parts fiber-forming polyhexamethylene adipamide, 100 parts paraformaldehyde, 400 parts methyl glycolate, 15 parts water and 3.4 parts 85% phosphoric acid was placed in a sealed vessel. The mixture was heated with agitation to 125° C. and maintained between 125 and 135° C. for 15 minutes. The mixture was then cooled rapidly to room temperature. The resulting clear viscous solution was diluted with 400 parts of an 80:20 (by volume) mixture of ethanol and water containing sufficient ammonia to neutralize the phosphoric acid, and then the resulting solution was filtered. The clear filtrate was poured into about 7000 parts of water and the product, N - carbomethoxymethoxymethyl polyhexamethylene adipamide, separated as a soft plastic mass which hardened during washing with water.

A solution of about 50 parts of the above-mentioned N-carbomethoxymethoxymethyl substituted polyamide, was prepared in 100 parts methanol at 60° C. To this solution was added 7 parts potassium hydroxide and the solution evaporated to dryness under reduced pressure to convert the N-carboxymethoxymethyl polyamide to the corresponding potassium salt. The dry polymeric salt remaining after evaporation of the methanol was found to dissolve readily in water.

Example IV

A solution of 350 parts polyhexamethylene adipamide in 1400 parts of a mixture of 1.2 parts 90% formic acid and 0.8 part of acetic anhydride was prepared at 64° C. To this solution was added, over the course of 4 minutes, a suspension of 430 parts paraformaldehyde in 1330 parts of methyl glycolate containing a trace of sodium hydroxide. Fifteen minutes after the beginning of the aldehyde addition 1330 parts of methyl glycolate was added and the mixture maintained at 60-64° C. for a further 15 minutes. The solution was then poured into a solution of 2800 parts of acetone in 3500 parts of ice cold water. Addition of aqueous ammonia to this solution caused the modified polymer to precipitate as a soft plastic mass. After washing with water and drying, the N-carbomethoxymethoxymethyl polyamide was found to have a saponification number of 141 which indicated that about 42% of the amide groups in the original polyamide had been converted into N-carbomethoxymethoxymethyl groups.

The above-mentioned N-carbomethoxymethoxymethyl polyhexamethylene adipamide was readily converted into the corresponding sodium salt, i. e., a polymeric salt containing groups of structure

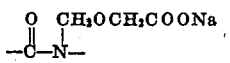

by heating a 20% solution of the ester in methanol at 60-65° C. with the calculated quantity of sodium hydroxide in methanol. Saponification was essentially complete after 20 minutes' heating. Water was then added and the methanol and water removed by vacuum distillation. The salt left as a residue is readily soluble in water.

Example V

A solution of 15 parts of fiber-forming polyhexamethylene adipamide in a mixture of 30 parts 90% formic acid and 15 parts acetic anhydride was prepared at 60° C. To this was added a suspension of 15 parts paraformaldehyde in 75 parts methyl lactate and 60 parts formic acid. After maintaining the solution for 45 minutes at 60° C., it was poured into a mixture of about 400 parts of acetone and 600 parts of water. The modified polymer was precipitated by the addition of sufficient ammonia to neutralize the acids present. The resulting fibrous white solid was found to have a saponification number of 79 which means that about 22% of the amide groups in the original polymers had been converted to groups of the formula

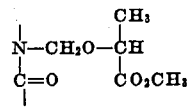

This product can be converted to a water soluble salt by the action of alkali by the method described in the foregoing example.

The polyamides used in the practice of this invention are of the general type described in U. S. Patents 2,071,250, 2,071,253 and 2,130,948. These polyamides, also referred to as nylons, generally speaking comprise the reaction products of a linear polymer-forming composition containing amide-forming groups, for example, reacting material consisting essentially of bifunctional molecules each containing two reactive groups which are complementary to reactive groups in other molecules and which include complementary amide-forming groups. These polyamides can be obtained by the methods given in the above mentioned patents and by other methods, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The preferred polyamides obtained from these reactants have a unit length of at least 7, where "unit length" is defined as in United States Patents 2,071,253 and 2,130,948. The average number of carbon atoms separating the amide groups in these polyamides is at least two.

These linear polyamides include also polymers, as for instance the polyester-amides, obtained by admixture of other linear polymer-forming reactants, as for instance glycol-dibasic acid mixtures or hydroxy acids, with the mentioned polyamide-forming reactants. Both the simple and modified linear polyamides contain the recurring amide groups

in which X is oxygen or sulfur and R is hydrogen or a monovalent hydrocarbon radical, as an integral part of the main chain of atoms in the polymer. On hydrolysis with hydrochloric acid the amino acid polymers yield the amino acid hydrochloride, and the diamine-dibasic acid polymers yield the diamine hydrochloride and the dibasic carboxylic acid, and the amino alcohol-dibasic acid polymers yield the amino alcohol hydrochloride and the dibasic carboxylic acid.

The polyamides used in the foregoing illustrative examples, and with which the invention is practiced to greatest advantage, are those having an intrinsic viscosity, as defined in U. S. 2,130,948, of at least 0.4.

Suitable acid catalysts are formic, acetic, chloroacetic, trimethylacetic, oxalic, p-toluenesulfonic, benzoic, maleic and phosphoric. When an hydroxyacid, rather than an ester thereof, is used as a reactant, it is not necessary to add another acid as catalyst although it is preferable to do so. The term "oxygen-containing acid" comprises mixtures of oxygen-containing acids and includes hydroxy carboxylic acids.

The mention of formaldehyde herein refers either to formaldehyde itself or to other forms of formaldehyde, e. g., paraformaldehyde and trioxane, and also formaldehyde-liberating materials.

Examples of hydroxyacids which can be used are glycolic, lactic, tartaric, 10-hydroxydecanoic, 12-hydroxystearic, and their esters, e. g., the methyl, ethyl, butyl, methoxyethyl, cyclohexyl, and benzyl esters. The corresponding nitriles (hydroxynitriles) can also be used.

The relative concentrations of reagents used can be varied considerably. Small amounts of formaldehyde (for example, 5% based on the weight of the polyamide) are operable and produce a definite change in the properties of the polyamide used. It is desirable, however, to use at least 25% formaldehyde, amounts varying from 25 to 200% of the polyamide being used to greatest advantage. The ratio of formaldehyde to hydroxy acid or ester can also be varied widely; generally, however, the molar ratio of these two ingredients will be from 1:2 to 2:1, equimolar ratios being preferred. When operating with an acid catalyst which is a solvent for the polyamide, e. g., formic acid, enough acid is generally used to dissolve the polyamide. However, much smaller amounts are also effective. When operating at elevated temperatures, 1 to 10% of acid based on the weight of the polyamide is generally employed.

The reaction by which the new polyamides of this invention are prepared is advantageously carried out at temperatures ranging from 50 to 150° C. However, temperatures from about room temperature (25° C.) to the decomposition temperature of the polyamide are operable.

The product of this invention are polyamides in which one or more of the amide groups in the polymer chain has the structure

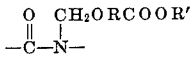

where R represents a divalent organic radical and R' represents hydrogen, or a group capable of replacing acidic hydrogen, such as a monovalent hydrocarbon group, a metal, a basic organic radical, or the ammonium radical. Examples of products in which R' constitutes a metal are the sodium and potassium salts described in the foregoing examples. Other salts are those in which one or more of the hydrogens in the carboxyl groups, i. e., R', are replaced by lithium, calcium, barium, bismuth, lead, iron, or complex organic ammonium groups, e. g., the trimethylbenzyl ammonium group.

The products of this invention can be used for a variety of purposes. As indicated in Example I the esters, i. e., the products in which R' is a hydrocarbon or substituted hydrocarbon radical, can be used to make films. They can also be formed into fibers, molded articles, and coating compositions. The water soluble products can be used to make films. They can also be used as gelatin substitutes, thickeners for aqueous solutions, and as modifying agents for viscose and protein spinning solutions. For these and other uses the products can be used alone or in conjunction with other materials, e. g., pigments, dyes, plasticizers, resins, fillers, and the like.

As many widely different embodiments of this invention may be made without departing from the spirit and scope thereof, it is to be understood that this invention is not to be limited to specific embodiments thereof, except as defined in the appended claims.

I claim:

1. A nitrogen-substituted linear polyamide having a unit length of at least 7 and containing in the polymer chain carbonamide groups having the structure

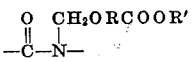

wherein R represents a saturated aliphatic divalent hydrocarbon radical containing from 1 to 17 carbon atoms, and R' represents a substituent selected from the group consisting of hydrogen, metals, the ammonium radical, and monovalent hydrocarbon radicals containing from 1 to 7 carbon atoms.

2. The polyamide set forth in claim 1 in which R' is hydrogen.

3. The polyamide set forth in claim 1 in which R' is a monovalent hydrocarbon radical containing from 1 to 7 carbon atoms.

4. The polyamide set forth in claim 1 in which R' is a metal.

5. A nitrogen-substituted linear polyamide having a unit length of at least 7 and containing in the polymer chain carbonamide groups having the structure

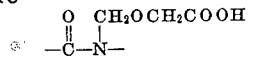

6. A nitrogen-substituted linear polyamide having a unit length of at least 7 and containing in the polymer chain carbonamide groups having the structure

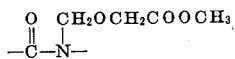

7. A process for obtaining a nitrogen-substituted polyamide which comprises reacting in contact with a catalyst a polyamide having a unit length of at least 7 and having in the polymer chain hydrogen-bearing carbonamide groups with formaldehyde and a hydroxy carboxylic acid of the formula HORCOOH, wherein R is a saturated aliphatic divalent hydrocarbon radical containing from 1 to 17 carbon atoms, said catalyst consisting of an oxygen containing acid having an ionization constant at least as great as $9.6 \times 10^{-6}$ and an equivalent conductance, measured at 25° C. in 0.01 normal concentration, no greater than 370 ohms$^{-1}$.cm.$^2$.

8. A process for obtaining a nitrogen-substituted polyamide which comprises reacting in contact with a catalyst a polyamide having a unit length of at least 7 and having in the polymer chain hydrogen-bearing carbonamide groups with formaldehyde and an ester of a hydroxy carboxylic acid, said ester having the formula HORCOOR', wherein R is a saturated aliphatic divalent hydrocarbon radical containing from 1 to 17 carbon atoms and R' is a monovalent hydrocarbon radical containing from 1 to 7 carbon atoms, said catalyst consisting of an oxygen containing acid having an ionization constant at least as great as $9.6 \times 10^{-6}$ and an equivalent conductance, measured at 25° C. in 0.01 normal concentration, no greater than 370 ohms$^{-1}$.cm.$^2$.

9. A process for obtaining a nitrogen-substituted polyamide which comprises reacting in contact with a catalyst a polyamide having in the polymer chain hydrogen-bearing carbonamide groups with formaldehyde and an ester of a hydroxy carboxylic acid, said ester having the formula HORCOOR', wherein R is a saturated aliphatic divalent hydrocarbon radical containing from 1 to 17 carbon atoms and R' is a monovalent hydrocarbon radical containing from 1 to 7 carbon atoms, and saponifying the resulting ester-containing nitrogen-substituted polyamide, said catalyst consisting of an oxygen containing acid having an ionization constant at least as great as $9.6 \times 10^{-6}$ and an equivalent conductance, measured at 25° C. in 0.01 normal concentration, no greater than 370 ohms$^{-1}$.cm.$^2$.

10. The process set forth in claim 8 in which said ester is a glycolic acid ester.

11. The process set forth in claim 8 in which said polyamide is polyhexamethylene adipamide and said oxygen-containing acid catalyst is formic acid.

THEODORE LE SUEUR CAIRNS.

REFERENCES CITED

The following references are of record in the file of this patent:

UNITED STATES PATENTS

| Number | Name | Date |
|---|---|---|
| 2,276,309 | Hummel et al. | Mar. 17, 1942 |